(12) United States Patent
Daguenet

(10) Patent No.: US 8,869,539 B2
(45) Date of Patent: Oct. 28, 2014

(54) ARRANGEMENT FOR CONNECTING A DUCT TO AN AIR-DISTRIBUTION CASING

(75) Inventor: Luc Henri Claude Daguenet, Corbeil Essonnes (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 14/128,294

(22) PCT Filed: Jun. 29, 2012

(86) PCT No.: PCT/FR2012/051509
§ 371 (c)(1),
(2), (4) Date: Dec. 20, 2013

(87) PCT Pub. No.: WO2013/001246
PCT Pub. Date: Jan. 3, 2013

(65) Prior Publication Data
US 2014/0109596 A1 Apr. 24, 2014

(30) Foreign Application Priority Data

Jun. 30, 2011 (FR) ..................................... 11 55901

(51) Int. Cl.
*F02C 7/20* (2006.01)
*F02C 7/18* (2006.01)
*F01D 11/24* (2006.01)

(52) U.S. Cl.
CPC ... *F02C 7/20* (2013.01); *F02C 7/18* (2013.01); *F05D 2240/91* (2013.01); *Y02T 50/675* (2013.01); *F05D 2260/208* (2013.01); *F01D 11/24* (2013.01)
USPC ................ 60/796; 60/806; 415/116; 165/169

(58) Field of Classification Search
CPC ..... F01D 11/24; F01D 25/12; Y10S 248/901; F02C 7/18; Y02T 50/675
USPC ......... 60/796, 806; 415/115, 116, 173.1, 178; 165/47, 82, 169
See application file for complete search history.

(56) References Cited

U.S. PATENT DOCUMENTS

| 4,412,782 | A | * | 11/1983 | Monsarrat | ..................... 415/175 |
| 4,849,895 | A | * | 7/1989 | Kervistin | ..................... 701/100 |
| 5,100,291 | A | * | 3/1992 | Glover | .......................... 415/115 |
| 5,205,115 | A | * | 4/1993 | Plemmons et al. | ............ 60/806 |

(Continued)

FOREIGN PATENT DOCUMENTS

| EP | 0 541 325 | 5/1993 |
| EP | 1 798 381 | 6/2007 |

OTHER PUBLICATIONS

International Search Report Issued Oct. 17, 2012 in PCT/FR12/051509 Filed Jun. 29, 2012.

*Primary Examiner* — J. Gregory Pickett
(74) *Attorney, Agent, or Firm* — Oblon, Spivak, McClelland, Maier & Neustadt, L.L.P.

(57) ABSTRACT

An arrangement for connecting at least one duct with an air-distribution casing, the at least one duct including two sidewalls opposite one another and including a peripheral wall connecting edges of the two sidewalls. The arrangement includes a connecting tube that extends through the casing, passes through an orifice associated with each of the two sidewalls, and is connected to the at least one duct. A system controlling clearance of a turbo engine and a turbo engine can include air-injection ducts connected to the distribution casing by such an arrangement.

11 Claims, 2 Drawing Sheets

(56) References Cited

U.S. PATENT DOCUMENTS

| | | | |
|---|---|---|---|
| 5,399,066 A | | 3/1995 | Ritchie et al. |
| 5,540,547 A | * | 7/1996 | Cole ............................ 415/177 |
| 6,035,929 A | * | 3/2000 | Friedel et al. ................. 165/168 |
| 6,149,074 A | * | 11/2000 | Friedel et al. .............. 239/127.1 |
| 6,185,925 B1 | * | 2/2001 | Proctor et al. .................. 60/806 |
| 7,491,029 B2 | * | 2/2009 | Pezzetti et al. .................... 415/1 |
| 7,597,537 B2 | * | 10/2009 | Bucaro et al. .............. 415/173.2 |
| 2002/0053837 A1 | * | 5/2002 | Arilla et al. ..................... 310/58 |
| 2007/0140839 A1 | * | 6/2007 | Bucaro et al. ................. 415/178 |
| 2008/0085182 A1 | * | 4/2008 | Guimbard et al. ............ 415/115 |
| 2010/0068043 A1 | * | 3/2010 | Shteyman et al. ............ 415/177 |

* cited by examiner

ARRANGEMENT FOR CONNECTING A DUCT TO AN AIR-DISTRIBUTION CASING

TECHNICAL FIELD

The invention proposes an arrangement for connecting at least one duct with an air-distribution casing.

The invention proposes more particularly an arrangement for a system for controlling the clearance in the turbine of a turbine engine that improves the connection of each duct with the casing.

PRIOR ART

Controlling the clearance in a turbine of a turbine engine consists in controlling the distance between the ends of the mobile blades of the turbine and fixed housing of the turbine in order to optimise the output of the turbine.

This controlling of the clearance consists mainly in injecting cold air on the housing in a controlled manner, in order to control its dilatation according to the operating conditions of the turbine.

The air is conveyed to the housing by the intermediary of a plurality of ducts which are connected to an air-distribution casing.

According to a known embodiment, the connecting of each duct with the distribution casing is carried out on a sidewall of the casing, which comprises a bushing whereon an end of the duct is secured.

The seal between the end of the duct and the associated bushing is provided by soldering.

According to such a connection, the duct is arranged overhanging in relation to the associated sidewall.

The vibrations of the turbine associated with this overhanging cause a weakening of the bushing and the appearance of cracks. Such cracks make the device for controlling the clearance non-compliant, and a re-working operation is then required.

This increases the cost and the manufacturing time of the device for controlling the clearance.

The invention has for purpose an arrangement for connecting at least one duct with an air-distribution casing that minimises the risks of the appearance of such cracks.

DESCRIPTION OF THE INVENTION

The invention proposes an arrangement for connecting at least one duct with an air-distribution casing to said at least one duct which comprises two sidewalls opposite one another and comprises a peripheral wall connecting the edges of the two planar walls, characterised in that it comprises a connecting tube which extends through the casing, passing through an orifice associated with each of the two sidewalls, and which is connected to said at least one duct and in that the edge of each orifice is bent outwardly from the casing and forms a bushing to which the connecting tube is secured.

The adding of a connecting tube passing through the two walls of the connecting casing makes it possible to suppress the overhanging on the connection of the duct to a sidewall, and consequently to prevent the appearance of such cracks.

More preferably, said connecting tube is a section of said at least one duct.

More preferably, an end of said connecting tube is connected to an associated end of said at least one duct.

More preferably, the connecting tube is open in the inside volume of the casing.

More preferably, the connecting tube is sealingly secured to each of the sidewalls.

More preferably, the connection between the connecting tube and each sidewall is carried out by soldering The invention also proposes a device for controlling the clearance of a turbine of a turbo engine which comprises a plurality of air-injection cooling ducts which are connected to an air-distribution casing, characterised in that each air-injection duct is connected to the air-distribution casing by an arrangement such as defined hereinabove.

More preferably, two air-injection ducts are associated to the same connecting tube and each of said two ducts is connected to an associated end of the connecting tube.

The invention also proposes an aircraft turbo engine characterised in that it comprises a device for controlling the clearance such as defined hereinabove.

BRIEF DESCRIPTION OF THE DRAWINGS

Other characteristics and advantages of the invention shall appear when reading the following detailed description for the understanding for which reference is made to the annexed drawings wherein.

DETAILED DESCRIPTION OF PARTICULAR EMBODIMENTS

Figure 1:
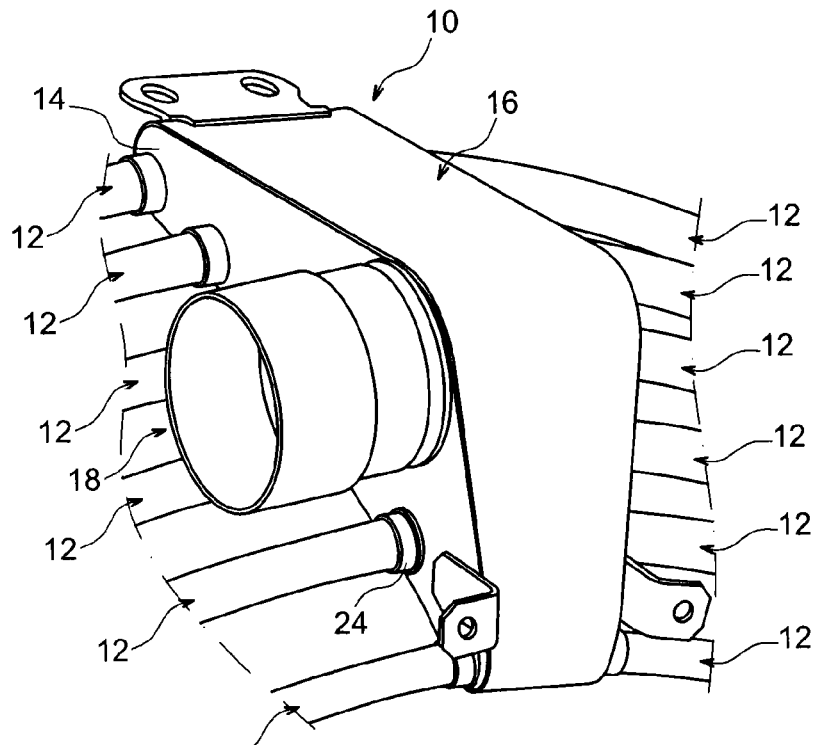
FIG. 1 diagrammatically shows in perspective a distributor of air for a system for controlling the clearance of a turbo engine.

FIG. 1 shows a distributor 10 for a system for cooling a housing (not shown) of an aircraft turbo engine.

The cooling system is part of a system for controlling the clearance of the turbo engine, in order to control the dilatation of the housing so as to retain a clearance defined between the housing and the ends of the blades of a low-pressure turbine of the turbo engine.

The cooling system comprises for this purpose a plurality of ducts 12 which are connected to the distributor 10 and which make it possible to convey air to the housing at different points.

The distributor 10 consists of a casing delimited by two substantially planar sidewalls 14 opposite one another, and a peripheral wall 16 which connects the sidewalls 14 together.

The distributor 10 further comprises a duct 18 for supplying air which opens in one of the sidewalls 14.

Each duct 12 is connected to the distributor 10 on an associated sidewall 14 which comprises an opening 20 associated to the duct 12.

The ducts 12 are evenly distributed on either side of the distributor 10.

More preferably, the ducts 12 and the sidewalls 14 are arranged symmetrically in relation to a median plane of the distributor 10 and they form an alignment along each sidewall, as can be seen in FIG. 1.

In accordance with the invention, each duct 12 is connected to the casing 10 by the intermediary of a connecting tube 22 which extends through the casing 10, each passing through the two sidewalls 14.

Each end of the connecting tube 22 is located outside of the casing 10 and is connected to a duct 12. As such, the connecting tube 22 passes through the opening 20 of a sidewall which is associated to the duct 12 in such a way that the connecting tube 22 passes through the casing 10 on either side.

The connecting tube 22 is sealingly secured to the casing 10, in order to prevent any air leaks at the openings 20 of the sidewalls 14.

To this effect, each sidewall 14 is shaped in such a way that the edge of each opening 20 is bent outwardly from the casing 10 forming a bushing 24 whereon the connecting tube 22 is secured, for example by soldering.

The connection of the inside volume of the casing 10 with each duct 12 is carried out by the intermediary of the connecting tube 22 which comprises an orifice 26 arranged in its cylindrical wall and which is open in the inside volume of the casing 10.

The section of this orifice 26 is determined according to the rate of air which must be admitted into the associated duct 12.

Since several ducts 12 are connected to the casing 10, the casing comprises several connecting tubes 22 such as defined hereinabove, and the section of the orifice 26 of each of these connecting tubes 22 is defined according to the flows of air admitted into each of the ducts 12.

As was stated hereinabove, each connecting tube 22 passes through the casing 10 in such a way that the two ends of the connecting tube are located outside of the casing 10.

According to the invention, each end of the connecting tube is connected to a duct 12.

Figure 2:
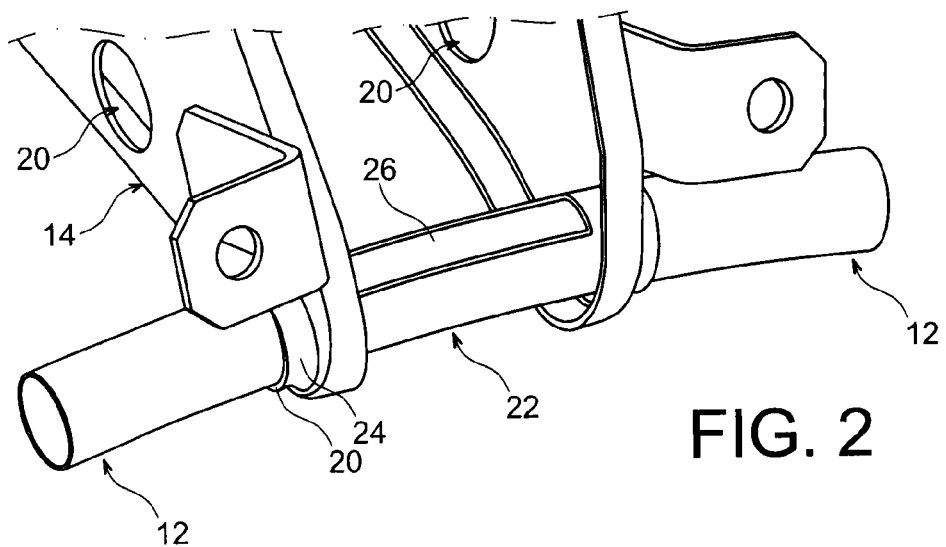
FIG. 2 is a detailed view on a larger scale of the distributor shown in FIG. 1 showing the inside of the distributor.

According to the embodiment shown in FIGS. 1 and 2, the connecting tube 22 is carried out in a single piece with the two associated ducts 12, i.e. the two ducts 12 located on either side of the casing 10 form a single duct which passes through the casing 10 and the associated connecting tube 22 is a section of this single duct.

Figure 3:
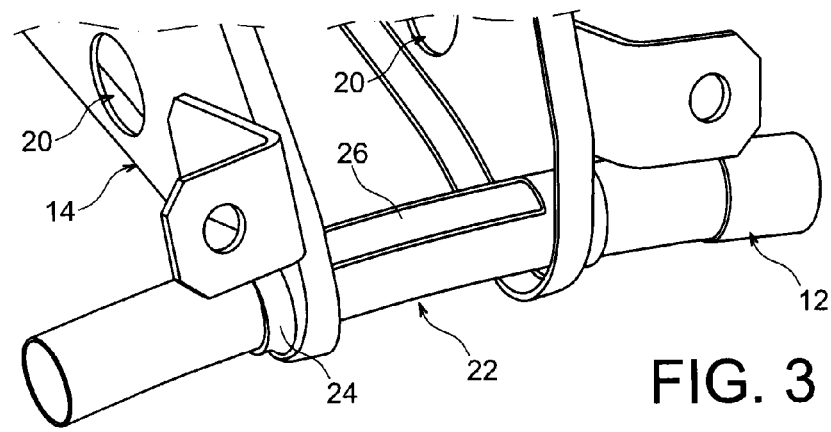
FIG. 3 is a view similar to that of FIG. 2, showing an alternative embodiment of the invention according to which the connecting tube is connected to an end of the duct.
Figure 4:
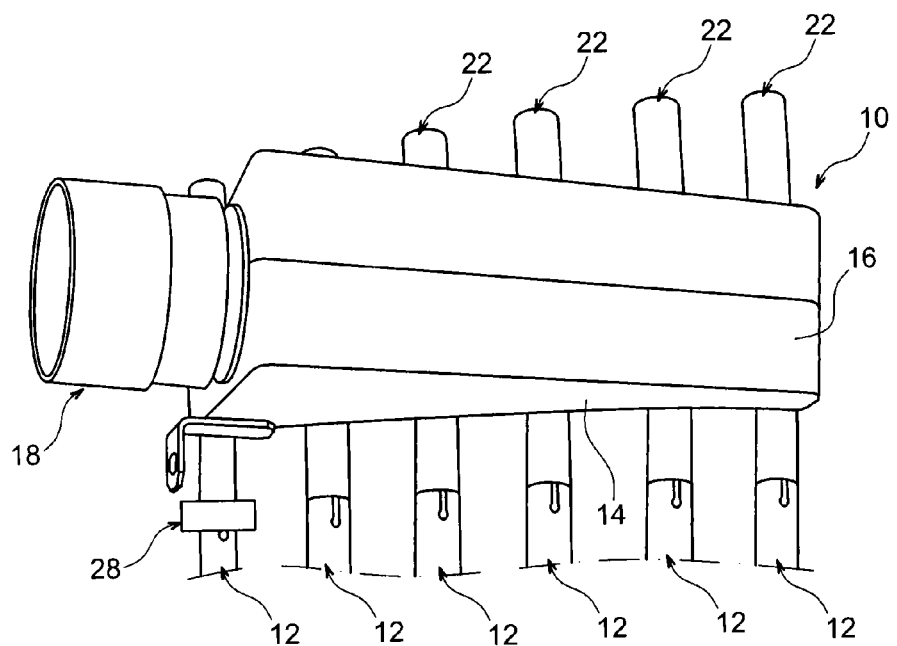
FIG. 4 shows a perspective view of the distributor to which a plurality of ducts is connected according to the arrangement shown in FIG. 3.

According to an alternative embodiment shown in FIGS. 3 and 4, an end of each duct 12 is nested on an associated end of the connecting tube.

Furthermore, here, a clamping ring 28 makes it possible to maintain the end of a duct 12 secured to the associated end of the connecting tube.

An arrangement according to this alternative embodiment makes it possible to form a subset comprising the casing 10 and the connecting tubes 22 of which the assembly is relatively easy and which can be manipulated easily in order to install it on the turbo engine.

The invention further relates to a system for controlling the clearance comprising ducts 12 connected to the distribution casing 10 according to an arrangement such as described hereinabove, i.e. each duct 12 is connected to the casing by the intermediary of a connecting tube 22 passing through the two sidewalls of the casing 10.

As such, the two ends of each connecting tube 22 are connected to a duct 12 of the system for controlling.

For this, the connecting tube 22 is a section of the duct 12 or, as shown in FIGS. 3 and 4, each end of the connecting tube 22 is press fitted into an associated end of the duct 12.

The invention claimed is:

1. An arrangement for connecting at least one duct with an air-distribution casing, the air-distribution casing including two sidewalls opposite one another and a peripheral wall connecting edges of the two sidewalls, the arrangement comprising:
    a connecting tube that extends through the casing and passes through an orifice associated with each of the two sidewalls, wherein an edge of each orifice is bent outwardly from the casing and forms a bushing to which the connecting tube is secured, and wherein
    an end of the connecting tube is connected to an associated end of the at least one duct.

2. An arrangement according to claim 1, wherein each end of the connecting tube extends outside of the air distribution casing.

3. An arrangement according to claim 1, wherein the connecting tube is open in an inside volume of the casing.

4. An arrangement according to claim 1, wherein the connecting tube is sealingly secured to each of the sidewalls.

5. An arrangement according to claim 4, wherein a connection between the connecting tube and each sidewall is carried out by soldering.

6. A device for controlling clearance of a turbine of a turbo engine comprising a plurality of air-injection cooling ducts that are connected to an air-distribution casing,
    wherein each air-injection duct is connected to the distribution casing by an arrangement as claimed in claim 1.

7. A device as claimed in claim 6, wherein two air-injection ducts are associated with a same connecting tube and each of the two ducts is connected to an associated end of the connecting tube.

8. An aircraft turbo engine comprising a device for controlling clearance according to claim 6.

9. An arrangement according to claim 1, wherein the connecting tube extends across an entire distance between the two sidewalls opposite one another.

10. An arrangement according to claim 1, wherein a duct that supplies air into the air-distribution casing opens in one of the sidewalls.

11. An arrangement according to claim 1, wherein a duct that supplies air into the air-distribution casing opens in the peripheral wall.

* * * * *